UNITED STATES PATENT OFFICE.

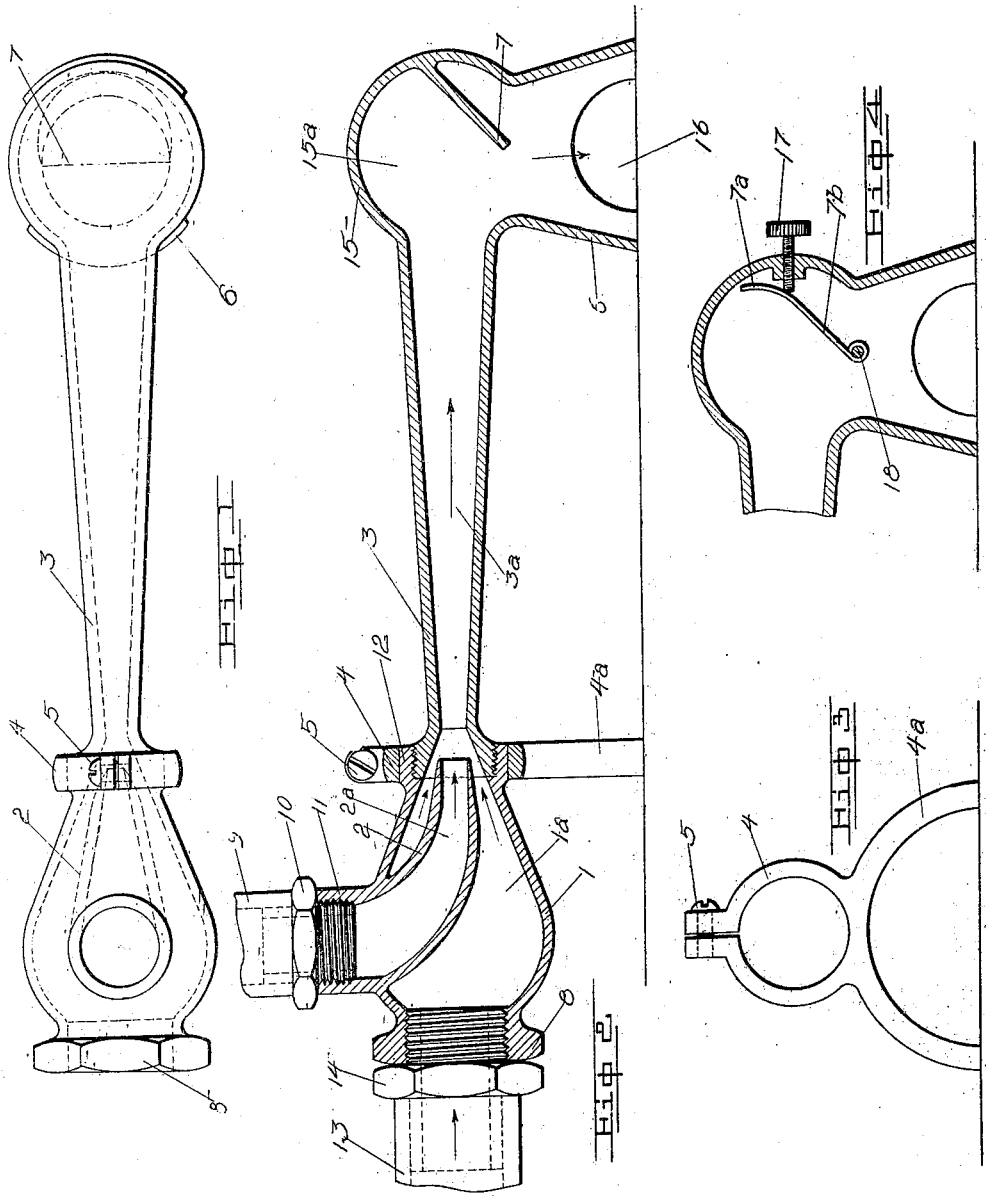

FRANK KENNEY, OF TROUTDALE, OREGON.

INJECTOR VACUUM-PRODUCER.

1,046,603.

Specification of Letters Patent.

Patented Dec. 10, 1912.

Application filed November 13, 1911. Serial No. 660,032.

*To all whom it may concern:*

Be it known that I, FRANK KENNEY, a citizen of the United States, residing at Troutdale, in the county of Multnomah and State of Oregon, have invented certain new and useful Improvements in Injector Vacuum-Producers, of which the following is a specification.

The present invention pertains to an improvement in vacuum producing apparatus and especially to a form of device by means of which a stream of water may be forcibly injected into and through a portion thereof in such manner as to drive the air from it at one side and thereby, to produce a vacuum in the remaining portion.

A further object is to arrange a system of tubings in such manner that a stream of water may be injected therein, so as to drive the air from the tubings, at one side, and produce a vacuum in the remaining portion of the system.

I accomplish these objects by the mechanism illustrated in the accompanying drawing, in which—

Figure 1 is a plan view of the device. Fig. 2 is a longitudinal vertical sectional view of Fig. 1. Fig. 3 is a detail of a clamp support. Fig. 4 shows a modification of a splash board.

Referring to the drawings in detail, 1 designates an expanded or bowl-shaped member consisting of a casing of the usual tube or pipe material, though it may be made of wood, brass or any desired material. The interior 1ª conforming to the exterior, is largest at the center, approaching a spherical form and converges to a comparatively small aperture, at what may be termed the forward end. The interior of this aperture is provided with suitable screw threads, and the exterior is adapted to receive the clamp collar 4, which is held thereon by the screw bolt 5, the collar having formed integrally therewith the legs 4ª upon which the device is supported.

At the upper side of the bowl 1 is formed an intake 11, which is provided with the usual internal screw threads, in which is engaged the union 10 to which is attached the water supply pipe 9. Entering the large end of the bowl is a similar screw threaded aperture adapted to receive the union 14, to which is attached the hose pipe 13. Within the aperture at the small end of the bowl is secured, by means of the usual screw threads, the tube 3 whose interior opening 3ª expands from said point of connection to its outer end, terminating in the enlarged spherical opening 15ª of the receptacle or catch-basin 15. The lower side of the catch-basin is left open and the side walls are extended downwardly to form the support 6, which has a length equal to that of legs 4. At suitable intervals about the rim of the base 6 is provided a number of openings 16 to permit the outflow of the water coming from the tubes 9 and 3. Under this construction the device may be maintained in a horizontal position, and may be placed in a sink, or in any suitable place where the water passing through it may be conducted away.

Depending from the intake 11 and formed integrally therewith, is a semicircular or crescent-shaped tube 2, which leads to the center of the bowl and inclines toward its smaller end, terminating within the aperture of the outlet tube, but leaving a small exterior space. This crescent or semicircular tube begins with the same diameter as the inlet tube 11 and diminishes to a small orifice 2ª.

The water entering from pipe 9 will be compressed into the converging orifice 2ª and will be caused to emerge with great force, entering the tube 3 which at its smaller end is of substantially the same diameter, as the outlet end of the orifice 2ª and completely filling its contracted portion at the beginning, driving the air from the bowl 1 and exhausting that in pipe 13, thereby making it a powerful suction pipe, the expansion of tube 3 augmenting this effect. As the water expands into the basin 15 its force becomes exhausted and it emerges quietly through the openings 16, where it may be conducted away in any convenient manner. A splash board 7 is formed in the casing of basin 15 and is inclined forwardly in front of the opening of tube 3, upon which the stream is projected and its force is thereby further dissipated before leaving the tubing.

In Fig. 4 is seen a modified form of splash board 7ᵇ; mounted on the transverse shaft 18, in front of the lower edge of tube 3. This board is inclined upwardly and outwardly against the side of the basin, with its extremity 7ª inclined toward the tube. In the outer wall of the basin is arranged a set screw 17, which bears against the splash board, and by means of which the latter may be adjusted back and forth, as may be necessary to control the force of water coming through. By this arrangement a powerful force of the water through the converging crescent shaped tube is obtained, and the force is completely controlled in the receptacle or basin 15.

It will be apparent that with a strong jet of water projected through the air surrounding tube 2, into and through the narrow aperture of tube 3, it will drive the air with it, exhausting the bowl and communicating tubes, as above stated.

The vacuum producer may be employed in removing dust from carpets, rugs and other fabrics, which dust may be drawn into tube 13 and washed away through the outlets 16. It is obvious that numerous other useful applications of the invention may be made. The article is neat and attractive in appearance, and the low cost of its construction and the effectiveness of its operation render it an implement of highest utility.

Having thus described my invention, what I claim is—

1. In a vacuum producer, an air chamber contracting from the inlet end to the outlet end, a tubular member in alinement with and connected directly to the air chamber to form a continuation thereof and expanding from the inlet end where it connects with the outlet end of the air chamber to its outlet end and there open to the atmosphere, and a converging tube for liquid under pressure entering the air chamber and having an outlet end in line with and in advance of the inlet end of the second named member and of a diameter at the outlet end substantially that of the inlet end of the second named member, the third member having its outlet end spaced from the inlet end of the second named member.

2. In a vacuum producer, two tubular members in alinement, each converging toward the point of connection of the two members and there positively connected together to form a single continuous conduit, and a nozzle member having a converging orifice in alinement with and spaced from the point of connection of the two members on the side of the second member remote from said point of connection, the cross sectional area of the nozzle orifice being substantially that of the throat formed at the connection of the two converging members.

3. In a vacuum producer, a tubular member having a contracted inlet end and expanding therefrom toward the outlet end and there formed into an enlarged basin with a laterally directed outlet communicating directly with the atmosphere and within the basin provided with a splash board in line with the longitudinal axis of the expanding member, and a jet forming member in line with and spaced from the inlet end of the expanding member, the area of the jet orifice being substantially that of the inlet end of the expanding member.

4. A hydraulic vacuum device comprising a tubular member having a large opening at one end and a small opening at the other and having its walls converging toward the small opening, a tubular member leading from the small opening of the first named member and there conforming in size thereto, said second member expanding gradually toward the end remote from the inlet end and provided at the outlet end with a catch basin opening directly to the atmosphere, means within the catch basin for receiving and diverting the discharge from the second member, a nozzle within the first member having its exit end in line with the inlet end of the second member and of substantially the same area, and spaced supports for the device, one of said supports being formed on the catch basin and receiving the discharge therefrom and the other of said supports engaging the device at the junction of the two tubular members.

In testimony whereof I affix my signature in presence of two witnesses.

FRANK KENNEY.

Witnesses:
W. G. KING,
A. J. MATTER.